United States Patent [19]
Horwitt et al.

[11] 3,719,105
[45] March 6, 1973

[54] REMOTE SWIVEL MOVEMENT CONTROL

[75] Inventors: Laurence G. Horwitt, New Haven; Donald J. Mattis, Norwalk, both of Conn.

[73] Assignee: Nelmor Incorporated, Warren, Mich.

[22] Filed: Oct. 7, 1971

[21] Appl. No.: 187,303

Related U.S. Application Data

[63] Continuation-in-part of Ser. No. 1,177, Jan. 7, 1970, Pat. No. 3,618,420.

[52] U.S. Cl. ............................................. 74/501 M
[51] Int. Cl. ................................................. F16c 1/14
[58] Field of Search ............. 74/501 M, 501 R, 501 P

[56] References Cited

UNITED STATES PATENTS

| | | | |
|---|---|---|---|
| 3,225,621 | 12/1965 | Augunas | 74/501 |
| 3,191,455 | 6/1965 | Fuqua et al. | 74/501 M |
| 3,552,228 | 1/1971 | Schrode | 74/501 M |

*Primary Examiner*—Milton Kaufman
*Assistant Examiner*—Frank H. McKenzie, Jr.
*Attorney*—E. Manning Giles et al.

[57] ABSTRACT

A remote actuator control for producing swivel movement for transmission through flexible cables utilizes a stationary socket-type member and a movable ball member in an arrangement wherein the cable ends are guided through the support member in spaced relation to anchor at points on the ball member which are remote from its ball surface. A manual actuator projects from the ball and through the socket member to a location where it is accessible to an operator. In this arrangement, the cable ends are masked from view from the operator side of the control and the control includes mounting connections which seal off the unit against passage of dirt or fluid and which prevent insertion of small foreign objects that might impair the operation of the unit.

4 Claims, 8 Drawing Figures

REMOTE SWIVEL MOVEMENT CONTROL

RELATED APPLICATIONS

This application is a continuation-in-part of co-pending application, Ser. No. 1177 filed Jan. 7, 1970 entitled "Mechanical Remote Control Apparatus" and issued on Nov. 9, 1971 as U.S. Pat. No. 3,618,420. The entire disclosure of said co-pending application is hereby specifically incorporated by reference.

BACKGROUND OF THE INVENTION

Mechanical remote control systems for transmitting swivel movement are widely used in connection with outside rearview mirrors for automobiles though numerous other remote control applications also exist. Currently, the outside mirror is typically mounted on the vehicle door and the inside control is also mounted on the door at a location to enable the driver to adjust the mirror setting while seated in normal driving position. The available clearance space within the door is rather limited, particularly as to depth, thereby imposing constraints upon the design freedom for the swivel joint in the control unit and upon the location of the cable ends. Such constraints have resulted in control arrangements subject to a number of appearance and protection problems, such as: the cable ends are, at times, visible from the operator side; the swivel joint is not sealed off against passage of direct or fluid; and the swivel joint is not adequately protected from possible damage due to insertion of foreign objects.

In current designs where vehicle doors utilize full width glass with no vent window, the internal door clearance is even more restricted so that the aforementioned constraints on design are even more pronounced. For example, a right angle support bracket has been employed for the control unit for the obvious purpose of accommodating guiding and anchorage of the flexible cables within the more restricted space limitations imposed by vehicle doors that utilize full width glass. These previous right angle cable guide and support designs for the control unit are particularly subject to the appearance and protection problems described above.

SUMMARY OF THE INVENTION

The invention provides a remote actuator control for producing swivel movement which is arranged to provide for anchorage of the flexible cables in a masked relationship that also serves to protect the swivel joint against passage of dirt or fluid and against insertion of foreign objects.

More particularly, the actuator control comprises a stationary socket-type support member having recessed guideways extending in a spaced relation about a spherically curved through-socket to guide the corresponding ends of the flexible cable, a ball-type swivel member having a ball portion seated in the through-socket for swivel movement relative thereto, the swivel member having anchorages remote from the ball portion and spaced in one-to-one correspondence with the guideways to secure the corresponding ends of the cables in masked relation and a manual actuator anchored in the ball portion to project in a direction opposite to the anchorages and extend beyond the through-socket to a location accessible to the operator.

It may be noted that the action of the tensioned cables on the swivel member holds the ball portion seated in the through-socket to not only mask the cable ends but to provide a permanently sealed socket.

In the preferred embodiment illustrated herein, the actuator control utilizes a socket-type support member in the form of a right angle guide bracket particularly suited to the close clearance relationships in current vehicle doors. The right angle guide bracket has recessed guideways arranged externally of the wall which defines the swivel socket to accommodate attachment of the cable ends at anchorage locations of larger radius than the ball.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification and in which like numerals are employed to designate like parts throughout the same:

(FIGS. 1, 1A and 1B correspond to FIGS. 1, 12 and 13, respectively, of Horwitt et al. U.S. Pat. No. 3,618,420.)

DESCRIPTION OF PRIOR ART

Figure 1:
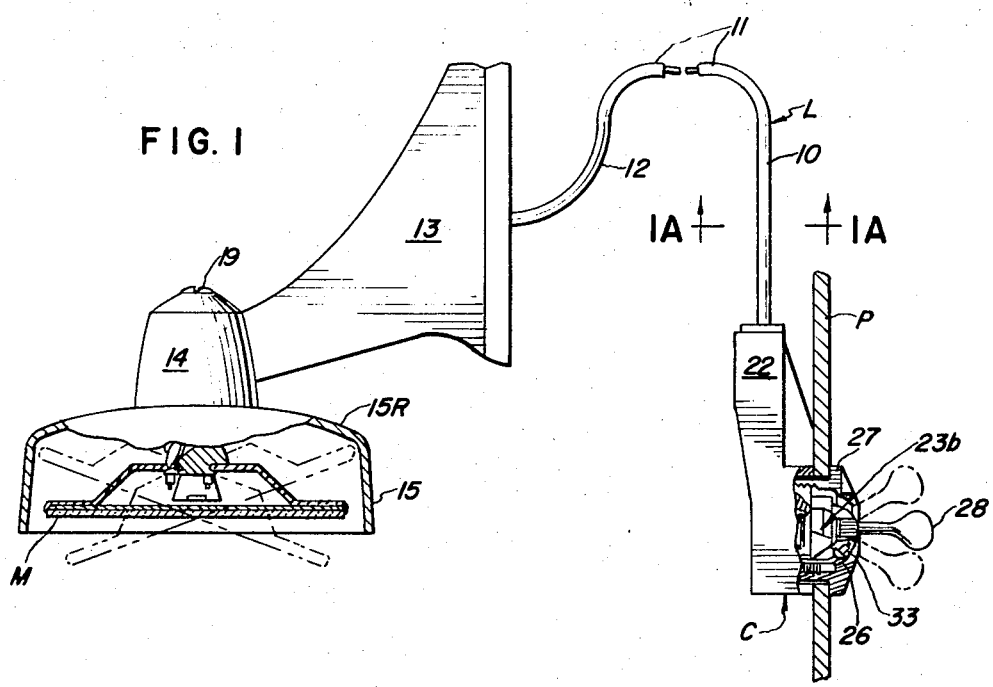
FIG. 1 is an elevational view partly in section showing an outside rearview mirror and control system applied to a vehicle door.

Referring now to the drawings, FIG. 1 illustrates a remote control arrangement of the type shown in the aforesaid Horwitt et al. U.S. Pat. No. 3,618,420 as applied to an automobile outside rearview mirror system having a mirror unit M adapted for mounting on the vehicle door, a control unit C adapted for mounting on an interior panel P of the vehicle door, and a control line L having a plurality of flexible cables connected at one end to the control unit C and at the other end to the controlled mirror M.

In the embodiment illustrated in FIG. 1, the control unit is shown to include an L-shaped cable guide and support bracket 22 located within the door space and providing a stationary ball portion 23B that cooperates with a spherical surface on a socket-type swivel member 26. An actuator 28 is connected to the swivel member 26 to control manual positioning thereof. Corresponding ends of the flexible cables in the control line L are anchored to the swivel member by means of ferrules 33. Finally, the bezel 27 is threadedly secured to the stationary support member 22.

It will be noted in connection with the FIG. 1 embodiment that the anchor ferrules 33 are visible from the operator's side of the unit and the tensioned cables normally act in a direction tending to pull the ball 23B away from the spherical seat defined on the socket member 26.

Figure 1A:
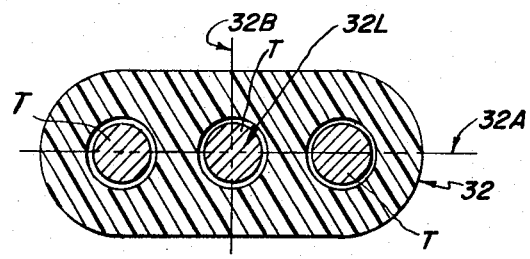
FIG. 1A is a transverse sectional view taken as indicated on the line 1A—1A of FIG. 1.
Figure 1B:
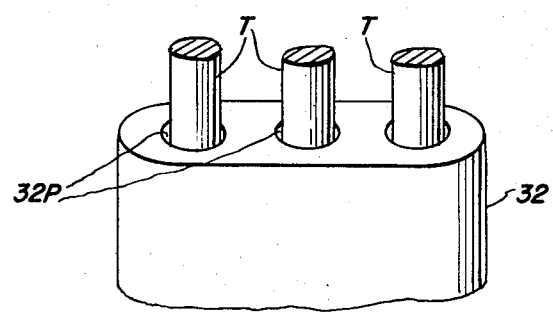
FIG. 1B is a fragmentary perspective view further illustrating the cable sheath of FIG. 1A.

In the detail views of FIGS. 1A and 1B, the control line is shown as comprising an elongated guide sheath 32 of resiliently flexible lubric plastic material having a set of three lengthwise guide holes or passages 32P extending in parallel relation therethrough. The individual control cables T are actually of twisted strand stainless steel wire and a set of three are shown in the preferred embodiment for transmitting swivel movement.

The guide sheath 32, as is best illustrated in FIGS. 1A and 1B, is oblong in transverse section to present a major axis 32A and a minor axis 32B. The oblong section contour enables preferential bending of the sheath about the major axis 32A while limiting resilient twisting of the sheath about its longitudinal axis 32L which is coaxial with the center guide passage 32P.

In the disclosed outside remote control mirror embodiment, the guide sheath is a one-piece extrusion of acetyl resin, with a major axis dimension of 0.260 inches, a minor axis dimension of 0.107 inches and guide passages of 0.047 inch diameter spaced 0.077 inches center to center and located in a common plane coincident with the lengthwise plane defined by the major axis of the sheath. The acetyl resin formulation is selected for its temperature characteristics, for example, its strength, resilience, flexibility and lubricity properties.

Figure 2:
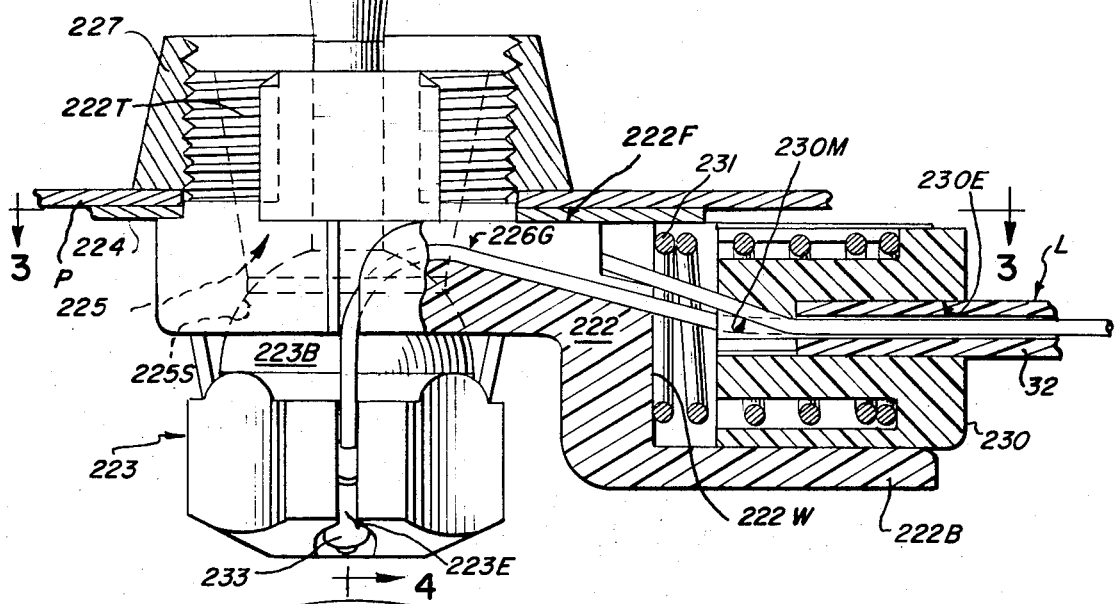
FIG. 2 is a side elevational view of the control unit of this invention mounted upon a door panel with portions broken away and sectioned to facilitate disclosure.
Figure 3:
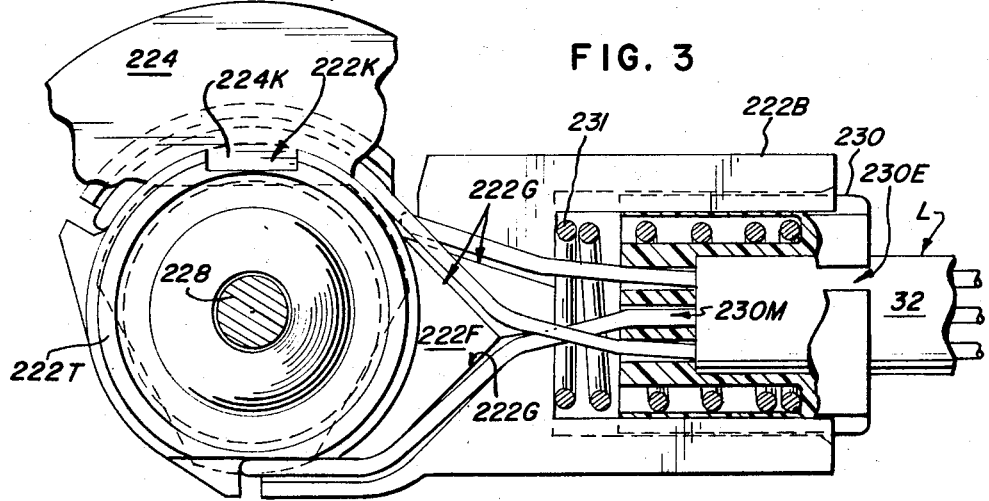
FIG. 3 is a developed sectional view taken approximately on the line indicated at 3—3 of FIG. 2 with portions of the structure broken away and sectioned to facilitate disclosure.
Figure 4:
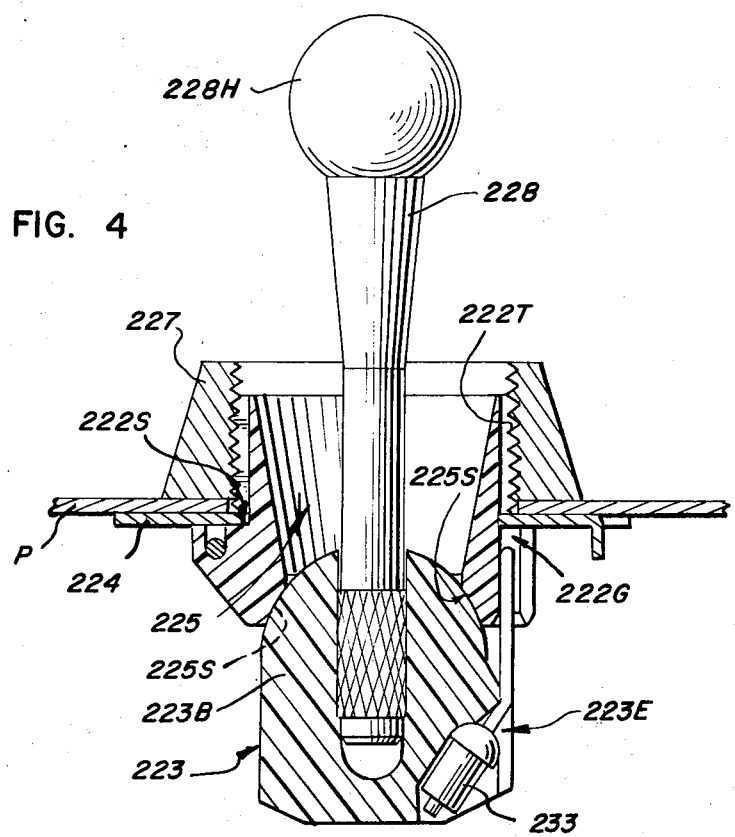
FIG. 4 is a section taken as indicated on the line 4—4 of FIG. 3.

An improved control unit is shown in FIGS. 2, 3 and 4 wherein the control line L is identical to the control line of the FIGS. 1, 1A and 1B embodiment.

Figure 5:
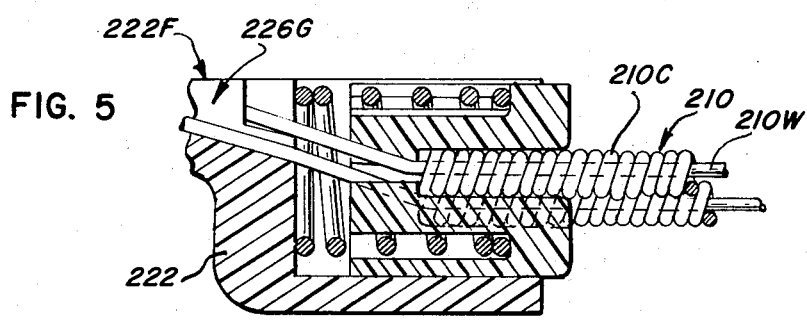
FIGS. 5 and 6 are fragmentary detail views partly corresponding to FIGS. 2 and 3, respectively, and showing the present control unit in association with an older style of armored cable.
Figure 6:
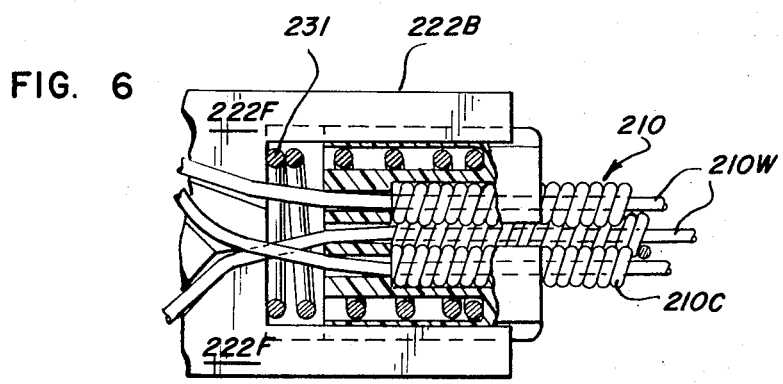

Another improved embodiment in accordance with the present invention is shown fragmentarily in FIGS. 5 and 6 wherein the control line consists of a conventional set of three armored cables 210, each having a central wire 210W protected by an individual coiled sheath 210C.

In the embodiment of FIGS. 2 to 4, the flexible cables enter the control unit in a common plane, whereas in the embodiments of FIGS. 5 and 6, the flexible cables are in a triangularly spaced relation as they enter the control unit. The flexible cables of FIGS. 5 and 6 may also be arranged in a common plane, if desired.

In the right angle control unit embodiment shown in FIGS. 2 to 4, reference characters in the 200 series are utilized. Thus, the control unit comprises a stationary socket-type guide and support bracket 222 having a guide face 222F with recessed guideways 222G serving as cable grooves that extend in spaced relation about a through-socket 225 which has an intermediate concave spherically curved surface 225S. The right angle guide bracket 222 is shown as including an integral tubular stub portion 222T for defining the through-socket, the stub portion 222T projecting through the door panel P and being externally threaded to receive a bezel nut 227.

The stub portion 222T of the guide bracket is shown bordered by an external shoulder 222S serving as a seat for a mounting washer 224 which is disposed between such shoulder and the inner face of the door panel P. The washer 224 has a radially inwardly projecting key portion 224K engageable in an external key slot 222K on the tubular stub portion 222T to prevent relative rotation of these parts.

The guide bracket 222 is also shown to include a recessed cross-wall 222W that is intercepted by the guide grooves 222G. The guide bracket has an elongated body portion 222B of parti-circular form defining a slideway that is bounded at one end by the recessed cross-wall 222W. The slideway is of generally tubular form and spans slightly more than 180° for receiving a floating adaptor 230 that is mounted in endwise shiftable relation in the socket.

The adaptor 230 has a central passage comprised of an entry region 230E of oblong section to mate with and receive the end of the cable sheath and a restricted mouth region 230M comprised of individual slots for each of the cables. A bias spring 231 is shown in the form of a wire coil reacting against the cross-wall 222W of the guide bracket and extending into an annular slot of the adaptor to react against a recessed adaptor shoulder normally to urge the adaptor 230 endwise outwardly of the guide bracket 222.

The swivel member 223 of the control unit has a ball portion 223B seated in the socket 225 of the stationary support bracket 222 for swivel movement relative thereto. The swivel member has edge slots 223E leading away from the ball portion 223B and spaced in one-to-one correspondence with the guideways 222G in the support bracket to provide anchorages for securing corresponding ends of the flexible cables in a masked relationship with respect to the operator side of the control unit. An actuator 228 comprising a stem anchored centrally in the ball portion projects from the through-socket in a direction opposite to the anchorages and terminates in a knob-shaped handle 228H.

The cable ends are shown equipped with ferrules 233 which nest in the anchorages 223E to secure the cables. It should be noted that the bias spring 231 in normally urging the adaptor 230 outwardly of the guide bracket 222 applies compression to the sheath which, in turn, subjects each of the flexible cables T to a uniform tension. The cables T thus act conjointly to draw the ball portion 223B onto the spherically curved surface of the through-socket, thus holding the swivel joint in an effectively sealed relationship so that the cable ends are masked from view and so that passage of dirt and fluid through the through-socket is precluded and so that insertion of foreign objects is also precluded.

The embodiment shown in FIGS. 5 and 6 is provided with identical reference numbers in the 200 series in view of the substantially similarities to the embodiment of FIGS. 2 to 4. The principal difference in the embodiment of FIGS. 5 and 6 is that the adaptor 230' has an entry socket 230E' of slightly different transverse sectional configuration to accommodate the set of three armored cables 210 that are used in place of the one-piece retainer sheath.

Thus, while preferred constructional features of the invention are embodied in the structure illustrated herein, it is to be understood that changes and variations may be made by those skilled in the art without departing from the spirit and scope of the appended claims.

What is claimed is:

1. A remote actuator control for producing swivel movement for transmission to a controlled member through a control line means that includes a plurality of tensioned flexible cables connected at one end to said control and at the other end to said controlled member, said actuator control comprising a stationary socket-type support member having recessed guideways extending in spaced relation about a concave spherically-curved surface of a through-socket to guide corresponding ends of said cables, a ball-type swivel member having a ball portion riding against said spherically-curved surface in the through-socket of said support member for swivel movement relative thereto, said swivel member having anchorages remote from the ball portion and spaced in one-to-one correspondence with said guideways to secure said corresponding ends of said cables in masked relation and enable the tensioned cables to hold the ball portion against said surface, and an actuator anchored in said ball portion to project from said through-socket in a direction opposite to said anchorages.

2. A remote actuator control as defined in claim 1 and wherein said support member includes a wall portion surrounding said through-socket and defining said spherically curved surface, said last-named wall portion having said recessed guideways located exteriorly thereof to mask the cable ends from the operator side of said control.

3. A remote actuator control as defined in claim 1 and wherein said support member is of right angle configuration and includes a tubular stub portion defining said through-socket and an elongated body portion projecting transversely from the tubular stub portion and having recessed grooves communicating with said recessed guideways for cooperatively guiding said cables.

4. A remote actuator control as defined in claim 3 and wherein said tubular stub portion includes a wall portion surrounding said through-socket and defining said spherically curved surface, said last-named wall portion having said recessed guideways located exteriorly thereof to mask the cable ends from the operator side of said control.

* * * * *